United States Patent [19]

Noshay et al.

[11] 4,077,904

[45] Mar. 7, 1978

[54] OLEFIN POLYMERIZATION PROCESS AND CATALYST THEREFOR

[75] Inventors: Allen Noshay, East Brunswick; Frederick John Karol, Belle Mead, both of N.J.

[73] Assignee: Union Carbide Corporation, New York, N.Y.

[21] Appl. No.: 700,843

[22] Filed: Jun. 29, 1976

[51] Int. Cl.² ............................ C08F 4/02; C08F 4/78
[52] U.S. Cl. ,.............................. 252/429 R; 252/441; 526/130; 526/170
[58] Field of Search ............................ 252/429 R, 441

[56] References Cited

U.S. PATENT DOCUMENTS

| | | | |
|---|---|---|---|
| 3,445,367 | 5/1969 | Kallenbach | 252/441 X |
| 3,709,853 | 1/1973 | Karapinka | 260/683.15 D |
| 3,761,427 | 9/1973 | Regier | 252/441 |

*Primary Examiner*—Patrick P. Garvin
*Attorney, Agent, or Firm*—Bernard Francis Crowe

[57] ABSTRACT

Catalysts for the polymerization of ethylene and the copolymerization of ethylene with other olefins have been prepared by depositing an organo-chromium compound on a silica support which has been fluorided at low temperatures.

14 Claims, No Drawings

OLEFIN POLYMERIZATION PROCESS AND CATALYST THEREFOR

BACKGROUND OF THE INVENTION

This invention pertains to the polymerization of ethylene alone or with olefins in the presence of silica supported organo-chromium compound and in particular to silica supports which have been fluorided.

Ethylene may be homopolymerized or copolymerized with other olefins at low pressures, i.e., less than 1,000 psig or high pressures, i.e., greater than 1,000 psig using catalyst compositions comprising organo-chromium compounds deposited on inorganic oxide supports such as silica, silica-alumina, thoria, zirconia, and the like. It has been found necessary in the past to first dry the supports in order to remove free moisture therefrom and then to activate the supports before depositon of the transition metal compound thereon, at temperatures of at least about 300° C and preferably at temperatures in the range of about 500 to about 850° C for periods of at least 4–8 hours. This activation step removes OH groups from the supports and provides active sites for the deposition of the transition metal compounds.

Even when these olefin polymerization catalysts are prepared under these stringent conditions, their utility from a commercial point of view is handicapped in that reproducibility of the catalyst composition is difficult to control and the activation equipment is apt to burn out under the long term, high temperature use to which it must be subjected.

The prior art does not provide an alternative low temperature method for preparing silica supported organo chromium compound catalysts which afford polymers of narrow molecular weight distribution while maintaining high polymerization activity and hydrogen response.

SUMMARY OF THE INVENTION

Commercially useful organo-chromium compound catalyst compositions for the polymerization of ethylene and the copolymerization of ethylene with other α olefins have been prepared with silica supports which have been fluorided at a temperature of about 100° C. to about 400° C. with less than 10% by weight of a fluoridation agent, preferably with about 1 to about 9% by weight of a fluoridation agent based on the weight of silica support.

The preferred catalyst compositions of this invention are those in which the above described fluorided silica supports have deposited thereon about 0.1 to about 15 weight % of organo-chromium compound based on the total weight of said catalyst compositions. More preferred catalyst compositions have about 0.5 to about 10 weight % of organo-chromium compound on said supports.

The silicas which may be used as a support in the catalyst composition of the present invention are porous materials having a high surface area, that is, a surface area in the range of about 50 to about 1,000 square meters per gram, and a particle size of about 25 to about 200 microns. For use in a fluid bed reactor process, the support particles are preferably capable of sub-division which is defined as the ability of the support particle to rupture when used in a fluidized bed as described below and in the presence of a polymer growing thereon and thereby extend itself to form many particles having a low catalyst residue.

Any grade of silica can be used but microspheroidal intermediate density (MSID) silica having a surface area of about 350 square meters per gram and a pore diameter of about 200 angstroms (G-952 grade of W. R. Grace and Co.), and intermediate density (ID) silica having a surface area of 285 square meters per gram and a pore diameter of 164 angstroms (G-56 grade of W. R. Grace and Co.) are preferred. Other grades such as the G-968 silica (as designated by W. R. Grace and Co.), have a surface area of 700 square meters per gram and a pore diameter of 50–70 angstroms and are satisfactory. Variations in melt index control and in polymer productivity can be expected between different grades of silica supports.

When incorporated in a porous silica support of high surface area, as described herein, the organo-chromium compound forms active sites on the surface and in the pores of the support. Without wishing to be bound by any theory of polymerization, it is believed that the polymers begin to grow at the surface of the supported catalyst as well as in its pores. When a pore grown polymer becomes large enough in a fluidized bed, it ruptures the support thereby exposing fresh catalyst sites in the inner pores of the supported catalyst as well as in its pores. The supported catalyst may thus subdivide many times during its lifetime in a fluidized bed and thereby enhance the production of low catalyst residue polymers, thereby eliminating the need for recovering the catalyst from the polymer particles. If the support is too large, it may resist rupture thereby preventing sub-division which results in catalyst waste. In addition, a large support may act as a heat sink and cause hot spots to form in a fluidized bed system.

A unique feature of this invention resides in the fact that fluoridation of the silica support can be carried out at relatively low temperatures such as 100°–400° C., 200°–400° C or 200°–300° C. This is not to say however that a pre-heating step cannot be used, if desired up to temperatures of about 900° C. As fluoridation temperature is increased from 100° C to 400° C., the amount of fluoridation agent used is less. This is believed due to the fact that fewer silanol groups need be contacted with the fluoridation agent since the heating can effect some removal of OH groups from the silica support.

Suitable fluoridation agents include but are not limited to the following: HF, $(NH_4)_2SiF_4$, $NH_4F$, $NH_4BF_4$, $Zn(BF_4)_2$, $Ni(BF_4)_2$, $Cd(BF_4)_2$, $Sn(BF_4)_2$, $Fe(BF_4)_2$ $(NH_4)_2TiF_6$, and the like. The fluoridation agents can be described more generally as any compound which will yield HF under the activation conditions employed. A list of such compounds is disclosed in U.S. Pat. No. 3,130,188 (Hogan), and U.S. Pat. No. 3,445,367 (Kallenbach) which are all incorporated herein by reference.

The organo-chromium compounds used in this invention are cyclopentadienyl or fused ring cyclopentadienyl compounds pi bonded to chromium and include chromocene compounds, such as, bis(cyclopentadienyl)chromium [II] compounds which have the structure:

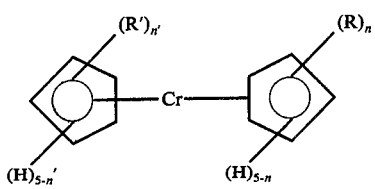
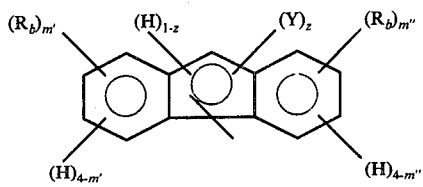

wherein each of R and R' is a hydrocarbon radical having 1 to about 20 carbon atoms and each of $n$ and $n'$ is an interger having values of 0 to 5 inclusive. The R and R' hydrocarbon radicals may be saturated or unsaturated and may include aliphatic radicals such as methyl, propyl, butyl, pentyl, allyl, and the like; alicyclic radicals such as cyclopentyl, cyclohexyl, cycloheptyl, and the like; and alicyclic radicals such cyclopentyl, cyclohexyl, cycloheptyl, and the like; and aromatic radicals such as phenyl, naphthyl and like radicals.

The chromocene compounds which may be used as catalysts on the silica supports in accordance with the present invention may be prepared as disclosed in U.S. Pat. Nos. 2,870,183 and 3,071,605 which are incorporated herein by reference.

In addition to the organo-chromium compounds disclosed above, other organo-chromium compounds which may be used on the silica supports of the present invention, as catalysts, include the fused ring bis(indenyl)- and bis(fluorenyl)-chromium[II] compounds disclosed in United States patent application Ser. No. 644,814 filed Dec. 29, 1975 and issued Mar. 29, 1977 as U.S. Pat. No. 4,015,059.

The disclosure of this patent application is incorporated herein by reference. These supported fused ring compounds are used in amounts of about 0.001 to 25%, or more, by weight, based on the combined weight of the fused ring compound and the silica support. These fused ring compounds may be deposited on the silica support of the present invention in the same manner as is the chromocene compounds, as disclosed above. The supported fused ring compounds may be used as ethylene polymerization catalysts.

These fused ring organo-chromium compounds have the structure

Ar-Cr[II]Ar' wherein Ar and Ar' are the same or different and are indenyl radicals of the structure

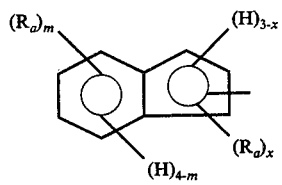

wherein the Ra's are the same or different $C_1$ to $C_{10}$, inclusive, hydrocarbon radicals, and $m$ is an integer of 0 to 4, inclusive and $x$ is 0, 1, 2 or 3, and fluorenyl radicals of the structure wherein the $R_b$'s may be the same or different $C_1$ to $C_{10}$, inclusive, hydrocarbon radicals, and $m'$ and $m''$ may be the same or different integers of 0 to 4, inclusive, and Y is H or $R_b$, and $z$ is 0 or 1. The $R_b$ hydrocarbon radicals may be saturated or unsaturated, and they may include aliphatic, alicyclic and aromatic radicals such as methyl, ethyl, propyl, butyl, pentyl, cyclopentyl, cyclohexyl, allyl, phenyl and naphthyl radicals.

The organo-chromium compounds may be used individually or in combination with one another. They are preferably deposited on the silica support from a solution thereof. This is preferably done by immersing the silica support in a solution of the organo-chromium compound and then evaporating the solvent under atmospheric or reduced pressures. The deposition of the organo-chromium compound is conducted after the treatment of the silica with the fluoridation agent. Alternatively, deposition of the organo-chromium compound may be carried out before the fluoridation treatment.

While about 0.1 to about 15 weight percent of the organo-chromium compound can be deposited on the silica support, it is preferred to use about 10 percent by weight of the organo-chromium compound. The deposition of 0.5 to 10 weight percent of organo-chromium compound corresponds to about 0.1 to 3.0 weight percent of chromium deposited on the silica support based on the combined weight of silica support and the chromium metal.

Ethylene may be polymerized with the catalyst of the present invention alone or with one or more alpha olefins. The alpha olefins used for copolymerization with ethylene in accordance with the present invention contain 3 to about 12 carbon atoms. These alpha olefins may be mono-olefins or non-conjugated di-olefins.

Exemplary mono-olefins include propylene, butene-1, pentene-1, 3-methylbutene-1, hexene-1, 4-methylpentene-1 3-ethylbutene-1, heptene-1, octene-1, decene-1, 4,4-dimethylpentene-1, 4,4-diethylhexene-1, 3,4-dimethylhexene-1, 4-butyl-1-octene, 5-ethyl-1-decene, 3,3-dimethylbutene-1, and the like. Illustrative of di-olefins which may be used include 1,5-hexadiene, dicyclopentadiene, ethylidene norbornene, and the like.

The polymers which are prepared in accordance with the teachings of the present invention are normally solid materials which have densities of about 0.945 to about 0.970 g./cc. inclusive, and melt indexes of about 0.1 to 100 decigrams per minute or more.

The preferred polymers are homopolymers of ethylene. The interpolymers contain at least 50 weight percent and preferably at least 80 weight percent of ethylene.

The fluoridation of the silica support involves two steps, viz., blending of the fluoridation agent with the silica followed by activation at a temperature of about 200° C. or higher. This blending operation is not critical and can be carried out by any of the mixing techniques well known in the art. For example, one convenient method consists in simply dry blending the fluoridation agent and silica in a tumbling device for about 30 to 60 minutes. An alternative mode consists of wet blending which is carried out by slurrying the silica with a solution of a fluoridation agent, such as, ammonium hexafluorosilicate in water or other solvents and stripping off the solvent at about 90° C. This is conveniently done on a laboratory scale using a simple rotating vacuum evaporator. The fluoridation temperature used for activating the silica support will depend upon the fluoridation agent used and the concentration of fluoridation agent. If one assumes that the surface of the silica support contains silanol groups, i.e., ≡ SiOH, the ratio of fluorine on the support to the silanol groups on the support can be used as a measure of the effect of concentration of fluoridation agent and activation temperature. It was found that with ammonium hexafluorosilicate at concentrations of 5%, 4%, and 3%, activation at temperatures of 200° C., 300° C., and 400° C. respectively, gave reasonably constant concentrations of residual silanol groups on the activated silica support. Ethylene polymerization activity was essentially identical with catalysts prepared by depositing chromocene on supports fluorided under these three conditions.

The percent fluoride content of the various fluorided silicas prepared was determined by neutron activation analysis.

The efficacy of ethylene polymerization catalysts comprising a chromocene compound deposited on a fluorided silica support was demonstrated both with laboratory scale polymerizations run in a pressure vessel and pilot plant studies run within a fluidized bed reactor. Among the criteria used for the evaluation of these catalysts were the density, melt flow ratio, melt index, yield, particle size, hydrogen response, and cyclohexane extractables of the resultant polyolefins obtained.

Density was determined by ASTM D-1505 and expressed in grams per cubic centimeter. Test plaques used for this determination are conditioned for one hour at 120° C. to approach equilibrium crystallinity.

Melt index was determined in confirmity with ASTM D-1238 at 190° C. and reported in decigrams/minute.

Flow rate was determined in accordance with ASYM D-1238 at 10 times the weight used in the melt index test, $$\text{Melt flow ratio (MFR)} = \frac{\text{Flow Rate}}{\text{Melt Index}}$$

Cyclohexane extractables were determined by determining the percent of the sample which is extracted by refluxing cyclohexane in 18 hours. Cyclohexane extractable figures are an indication of the amounts of low molecular weight polymers formed with a particular catalyst. For many end-use applications, low cyclohexane extractables are obviously desirable.

Particle size was determined by sieve analysis and expressed in units of diameter in inches.

The polymerization of ethylene alone or in conjunction with alpha olefin comonomers was conducted by contacting the monomer charge with a catalytic amount of the fluorided silica supported chromocene at a temperature and pressure sufficient to initiate the polymerization reaction. If desired an inert organic solvent may be used as a diluent and to facilitate materials handling.

The polymerization of ethylene alone or in conjunction with alpha olefin comonomers was conducted by contacting the monomer charge with a catalytic amount of the fluorided silica supported chromocene compounds at a temperature and pressure sufficient to initiate the polymerization reaction. If desired an inert organic solvent may be used as a diluent and to facilitate materials handling.

The polymerization reaction temperature is in the range of from about 30° C. or less up to about 100° C. or more, depending to a great extent on the operating pressure, the pressure of the entire monomer charge, the particular catalyst system used and the catalyst concentration. The selected operating temperature is dependent on the desired polymer melt index since such temperature is also a factor in adjusting the molecular weight of the polymer. Preferably the temperature is in the range of about 30° C. to about 100° C. in the conventional slurry or particle forming process which is conducted in an inert organic solvent medium. As with most olefin polymerization reactions, higher polymerization temperatures tend to produce lower weight average molecular weight polymers, that is, polymers of higher melt index.

The pressure can be any pressure sufficient to initiate the polymerization of the monomer charge and can be from subatmospheric pressure using an inert gas as a diluent, to superatmospheric pressures of up to about 1,000,000 psig, or more. The preferred pressures are in the range from atmospheric up to about 1,000 psig. It is even more preferred to use pressures of about 20 to about 800 psig.

When an inert organic solvent medium is employed in the process of this invention, it should be one which is inert to all the other components and products of the reaction system and be stable at the reaction conditions being used. It is not necessary, however, that the inert organic solvent medium also serve as a solvent for the polymer produced. The inert organic solvents which may be used includes saturated aliphatic hydrocarbons, such as, isopentane, hexane, heptane, isooctoane, purified kerosene and the like; saturated cycloaliphatic hydrocarbons, such as cyclopentane, cyclohexane, dimethylcyclopentane, methylcyclohexane, and the like; aromatic hydrocarbons such as, benzene, toluene, xylenes, and the like; and chlorinated hydrocarbons such as chlorobenzene, tetrachloroethylene, trichloroethylene, ortho-dichlorobenzene, and the like. Particularly preferred solvent media are cyclohexane, pentane, isopentane, hexane, and heptane.

When it is preferred to conduct the polymerization to a high solids level, it is desirable that the solvent be liquid at the reaction temperature. For example, when operating at a temperature which is lower than the solution temperature of the polymer and the solvent, the process can be essentially a slurry or suspension polymerization process in which the polymer actually precipitates out of the liquid reaction medium and at which the catalyst is suspended in a finally divided form.

This slurry system is of course dependent upon the particular solvent employed in the polymerization and its solution temperature for the polymer prepared. Consequently in the particle form embodiment it is most desirable to obtain a temperature which is lower than the normal solution temperature of the polymer in the selected solvent. For example, polyethylene prepared herein may have a solution temperature in cyclohexane of about 90° C., whereas in pentane its solution temperature may be about 100° C. It is characteristic of this particle form polymerization system that a high polymer solids content is possible even at low temperatures if sufficient agitation is provided so that adequate mixing of the monomer with the polymerizing mass can be accomplished. It appears that while the polymerization rate may be slightly slower at the lower temperature, the monomer is more soluble in the solvent medium, thus counteracting any tendency towards low polymerization rates and/or low yield of polymer.

It is also characteristic of the slurry process that the monomer appears to have substantial solubility characteristics even in the solid portion of the slurry so that as long as adequate agitation is provided, and the polymerization temperature maintained, a broad range of size of solid particles in the slurry can be provided. Experience has shown that the slurry technique can produce a system having more than 50 percent solids content provided that conditions of sufficient agitation are being attained. It is particularly preferable to operate the slurry process in the range of about 30 to about 40 weight percent polymer solids.

Recovery of the polymer from the solvent medium is reduced to a simple filtration and/or drying operation and no effort need be expended in polymer cleanup and catalyst spearation or purification. The residual concentration of catalyst in the polymer is so small that it can be left in the polymer without experiencing deleterious effects.

When the solvent serves as the principal reaction medium, it is desirable to maintain the solvent medium substantially anhydrous and free of any possible catalyst poison such as moisture and oxygen, by redistilling or otherwise purifying the solvent before use in this process. Treatment with an absorbent material, such as, high surface area silicas, aluminas, molecular sieves and the like are beneficial in removing trace amounts of contaminants that may reduce polymerization rate or poison the catalyst during the polymerization reaction.

By conducting the polymerization reaction in the presence of hydrogen which functions as a chain transfer agent, the molecular weight of the polymer may be further controlled. This phenomenon is referred to as the "hydrogen response" of the catalyst.

Experience has shown that hydrogen may be used in the polymerization reaction in amounts varying between about 0.001 to about 10 mols of hydrogen per mole of olefin monomer. For most polymerization reactions, however, the entire molecular range may be obtained by using from about 0.001 to about 0.5 mols of hydrogen per mol of monomer.

The homopolymerization or copolymerization of ethylene with the catalyst of this invention can also be accomplished in a fluid bed reaction process. An example of a fluid bed reactor and process which can be used for this purpose is disclosed in United Kingdom Pat. No. 1,253,063 which is incorporated herein by reference.

The invention is further illustrated in the examples which follow. All parts and percentages are by weight unless otherwise specified.

EXAMPLES 1–4

A. PREPARATION OF FLUORIDED SILICA SUPPORT

Undried G-952 grade silica (W. R. Grace and Co.) was slurried in aqueous solutions containing varying amounts of $(NH_4)_2SiF_6$ and then vacuum stripped dry at at temperature of less than 100° C. The dried mixture was then activated by exposure to a temperature of about 200° C. for about 24 hours. This technique was used to provide activated silica support samples which had been treated with 2, 4, 5 and 6% by weight of $(NH_4)_2SiF_6$ based on the weight of silica. Controls B and C were made with 10 and 20% by weight of $(NH_4)_2SiF_6$ respectively.

B. PREPARATION OF FLUORIDED SILICA SUPPORTED CHROMOCENE POLYMERIZATION CATALYSTS

Four olefin polymerization catalyst samples were then prepared by slurrying 0.4 gram portions of each of the activated silica supports made as in the preceeding paragraph with 20 mg. portions of bis(cyclopentadienyl)chromium [II] (chromocene) in about 100 ml. of n-hexane. The slurries were stirred for about 30 minutes to allow the chromium compound to deposit on the activated supports. Control A was prepared as in the preceeding paragraph from silica treated as in A but without adding any $(NH_4)_2SiF_6$.

Controls B and C were prepared as in the preceeding paragraph and were the same as the Examples except that the silica supports were treated with higher concentrations of $(NH_4)_2SiF_6$, viz., 10 and 20% respectively.

Control D is an unfluorided catalyst consisting of 20 mg. of bis(cyclopentadienyl)chromium [II] in about 100 ml. of n-hexane deposited on 0.4 g. of G-952 grade silica which had been activated by heating to about 600° C. for 24 hours as described in U.S. Pat. No. 3,709,853.

C. SLURRY POLYMERIZATION OF ETHYLENE

A stirred high pressure reaction vessel having a void of 1000 ml. was charged in separate runs with each of the 4 catalyst and the 4 Control slurries described in the preceeding paragraph. After charging the vessel with the particular catalyst sample or Control, the vessel was sealed and pressurized with 175 psig of ethylene and 25 psig of hydrogen giving a total pressure of about 200 psig. Agitation was started and the reactor temperature raised to about 60°–70° C. Polymerization was allowed to proceed at this temperature for about 60 minutes. The reactor was cooled to room temperature and depressurized.

The yield of polyethylene in grams was recorded for the four Examples and four Controls. The results are tabulated in Table 1. These data demonstrate that the catalyst activity is dependent on the concentration of $(NH_4)_2SiF_6$ used in treating the silica support. The optimum concentration of $(NH_4)_2SiF_6$ is about 5% by weight. The catalyst made using this optimum concentration of $(NH_4)_2SiF_6$ is equivalent to unfluorided chromocene catalysts which require high activation temperatures, i.e., 600° C. for 24 hours (Control D). The unfluorided silica support, Control A showed a very poor yield of polyethylene as did samples made with 10 and 20% $(NH_4)_2SiF_6$, (Controls B and C respectively).

TABLE 1
EFFECT OF $(NH_4)_2SiF_6$ CONCENTRATION ON SILICA SUPPORTED CHROMOCENE POLYMERIZATION CATALYSTS

| EXAMPLE NO. | Wt.% $(NH_4)_2SiF_6$ USED TO PREPARE SILICA SUPPORT | ACTIVATION TEMP. (°C) | YIELD OF POLYETHYLENE AFTER 60 MINUTES POLYMERIZATION GRAMS |
| --- | --- | --- | --- |
| CONTROL A | 0 | 200 | 5 |
| 1 | 2 | 200 | 33 |
| 2 | 4 | 200 | 92 |
| 3 | 5 | 200 | 160 |
| 4 | 6 | 200 | 99 |
| CONTROL B | 10 | 200 | 0 |
| CONTROL C | 20 | 200 | 0 |
| CONTROL D | 0 | 600 | 164 |

The data therefore show that the silica support should contain less than 10% by weight of fluoridation agent.

EXAMPLES 5-16

A. PREPARATION OF FLUORIDED SILICA SUPPORT

The preparation of the fluorided silica support was carried out as described in Example 1 with the exception that the silica was dry-blended with $(NH_4)_2SiF_6$ instead of using an aqueous solution of the latter. Activation of the silica-$(NH_4)_2SiF_6$ supports were again carried out by heating at about 200° C. for about 24 hours. Three separate batches of fluorided silica supports were thus prepared using 4, 5 and 6% by weight of $(NH_4)_2SiF_6$.

B. PREPARATION OF FLUORIDED SILICA SUPPORTED CHROMOCENE POLYMERIZATION CATALYSTS

Olefin polymerization catalyst samples were prepared by slurrying four different amounts of each of the fluorided silica supports prepared in (A) above with 100 ml. portions of n-hexane containing 20 mg. of chromocene. Catalysts slurries were thus provided containing 5, 2.5, 1.3 and 0.6% by weight of chromocene on silica supports treated with 4, 5 and 6% by weight of $(NH_4)_2SiF_6$ respectively.

Controls E and F were prepared as in Example 1B from non-fluorided silica activated by heating to 600° C. for 4-8 hours before depositing chromocene thereon. These Controls contained 5% and 2.5% by weight of chromocene respectively.

C. SLURRY POLYMERIZATION OF ETHYLENE

The ethylene polymerization runs used to evaluate the catalyst and Control slurries prepared as in the preceding paragraph were the same as those described in Example 1(C) with the exception that the yields of polyethylene in each run were compared after a 30 minute polymerization time rather than after 60 minutes.

The data obtained from these evaluations are delineated in Table 2. They demonstrate that lower chromocene loading on fluorided silica supports are beneficial to catalyst activity. They also demonstrate that at optimum levels of $(NH_4)_2SiF_6$ and chromocene, the activity of these catalysts is as good or better than the unfluorided chromocene catalysts of the prior art (Controls E and F).

TABLE 2
INTERRELATIONSHIP OF CHROMOCENE LOADING AND $(NH_4)_2SiF_6$ CONCENTRATION OF SILICA SUPPORTED POLYMERIZATION CATALYSTS

| Example No. | Wt.% $(NH_4)SiF_6$ used to prepare Silica Support | Wt., g., of Fluorided Support | Wt.% Chromocene on Fluorided Silica Support | Activation temp. (°C.) | Yield of Polyethylene after 30 min. Polymerization grams |
| --- | --- | --- | --- | --- | --- |
| 5 | 4.0 | 0.4 | 5.0 | 200 | 166 |
| 6 | 4.0 | 0.8 | 2.5 | 200 | 212 |
| 7 | 4.0 | 1.6 | 1.3 | 200 | 236 |
| 8 | 4.0 | 3.2 | 0.6 | 200 | 237 |
| 9 | 5.0 | 0.4 | 5.0 | 200 | 123 |
| 10 | 5.0 | 0.8 | 2.5 | 200 | 227 |
| 11 | 5.0 | 1.6 | 1.3 | 200 | 235 |
| 12 | 5.0 | 3.2 | 0.6 | 200 | 236 |
| 13 | 6.0 | 0.4 | 5.0 | 200 | 37 |
| 14 | 6.0 | 0.8 | 2.5 | 200 | 92 |
| 15 | 6.0 | 1.6 | 1.3 | 200 | 150 |
| 16 | 6.0 | 3.2 | 0.6 | 200 | 209 |
| Control E | 0 | 0.4 | 5.0 | 600 | 205 |
| Control F | 0 | 0.8 | 2.5 | 600 | 218 |

EXAMPLES 17-19

A. PREPARATION OF FLUORIDED SILICA SUPPORT

Fluorided silica supports were prepared using different fluoridation agents. Thus using the procedure described in Example 5, G-952 grade silica was dry-blendeed with 5% by weight of $(NH_4)SiF_6$, 4.5% by weight of $NH_4BF_4$ or 6.3% by weight of $NH_4F$. Activation was again effected by heating the treated supports at 200° C. for 24 hours.

B. PREPARATION OF FLUORIDED SILICA SUPPORTED CHROMOCENE POLYMERIZATION CATALYSTS

Olefin polymerization catalyst samples were prepared by slurrying 1.6 gram portions of each of the fluorided supports from the preceding paragraph A with 100 m. portions of n-hexane containing 20 mg. of chromocene. Catalyst slurries were thus provided containing 1.3% by weight of chromocene. Control G catalyst slurry prepared in the same manner as Control E, described supra, was used as a representative unfluorided high temperature activated catalyst.

C. SLURRY POLYMERIZATION OF ETHYLENE

The polymerization procedure outlined in Example 1C was carried out using the three fluorided catalyst slurries from paragraph B containing 1.6 grams of solid catalyst and Control E catalyst slurry containing 0.4 grams of silica. The yield of ethylene polymer, melt index and melt flow ratio obtained with each catalyst is shown in Table 3. These data demonstrate that all three fluoridation agents produced comparable polymerization catalysts which in turn are comparable to the unfluorided Control G catalyst.

chromocene. A slurry of Control H catalyst was prepared in the same way.

C. SLURRY POLYMERIZATION OF ETHYLENE

The catalyst and Control E slurries prepared in B were evaluated using the polymerization procedure described in Example 1C but using 30 minute polymerization times.

The data from these evaluations are presented in Table 4. They show that polyethylene prepared with the low temperature fluorided catalysts represented by Examples 20–22 is similar in physical properties to that produced by prior art unfluorided chromocene catalyst. High polymerization activity can be attained by balancing a combination of concentration of fluoridation agent with activation temperature. The data also show that fluoridation at high temperature (600° C.) does not offer any advantage in activity over high temperature activation without fluoridation.

TABLE 3

Effect of Structure of Fluoridation Compounds on the Properties of Silica-Supported Chromocene Polymerization Catalyst

| Example No. | Fluoridation Agent | | ACTIVATION Temp. (° C.) | Wt. of Silica Used, grams | yield of Polyethylene after 30 minute Polymerization, grams | Properties of Polyethylene produced | |
|---|---|---|---|---|---|---|---|
| | Compound | Wt. % used to treat Silica Support[a] | | | | Melt Index | Melt Flow Ratio |
| 17 | $(NH_4)_2SiF_6$ | 5.0 | 200 | 1.6 | 238 | 0.8 | 47 |
| 18 | $NH_4BF_4$ | 4.5 | 200 | 1.6 | 208 | 0.7 | 42 |
| 19 | $NH_4F$ | 6.3 | 200 | 1.6 | 212 | 1.2 | 42 |
| Control G | 0 | 0 | 600 | 0.4 | 229 | 1.0 | 45 |

[a]Calculated to provide a constant equivalent ratio of F/≡SiOH of 0.68

TABLE 4

EFFECT OF $(NH_4)_2SiF_6$ CONCENTRATION AND ACTIVATION TEMPERATURE ON ETHYLENE POLYMERIZATION

| EXAMPLE NO. | WT. % $(NH_4)_2SiF_6$ USED TO TREAT SILICA SUPPORT | ACTIVATION TEMP. ° C | YIELD OF POLYETHYLENE AFTER 30 MINUTES POLYMERIZATION, GRAMS | PROPERTIES OF POLYETHYLENE PRODUCED | | | |
|---|---|---|---|---|---|---|---|
| | | | | MELT INDEX | MELT FLOW RATIO | DENSITY | % CYCLOHEXANE EXTRACTABLES |
| 20 | 5.0 | 200 | 193 | 1.7 | 43 | 0.957 | 2.0 |
| 21 | 4.0 | 300 | 232 | 3.2 | 42 | — | — |
| 22 | 3.0 | 400 | 222 | 1.4 | 47 | 0.958 | 2.7 |
| 23 | 1.0 | 600 | 209 | 2.5 | 44 | 0.959 | 2.3 |
| CONTROL H | 0 | 600 | 195 | 3.6 | 38 | 0.963 | 1.5 |

EXAMPLES 20–23

A. PREPARATION OF FLUORIDED SILICA SUPPORT

Samples of G-952 grade silica were slurried wigh aqueous solutions containing 5.0, 4.0, 3.0, and 1.0% by weight of $(NH_4)_2SiF_6$ based on the weight of silica, and then dried. The four dried mixtures were then activated by heating for about 24 hours at temperatures of 200° C., 300° C., 400° C., and 600° C. respectively. Control H catalyst prepared in the same manner as the Control E catalyst described above was used as a representative unfluorided high temperature activated polymerization catalyst.

B. PREPARATION OF FLUORIDED SILICA SUPPORTED CHROMOCENE POLYMERIZATION CATALYSTS

Olefin polymerization catalysts were prepared by slurrying 1.6 gram samples of each of fluorided supports from the preceding paragraph A with 100 ml. portions of n-hexane containing 20 mg. of chromocene. Catalysts were thus provided containing 1.3% by weight of

EXAMPLES 24–25

The following Examples demonstrate that wet blending and dry blending of the fluoridation agent with the silica support afford polymerization catalysts of equivalent activity and ethylene polymers having equivalent melt flow properties.

One preparation used an aqueous slurry containing 5% by weight of $(NH_4)_2SiF_6$ based on the weight of G-952 grade silica treated. After drying at 90° C. in vacuo, the sample was activated for 24 hours at 200° C.

A slurry of 20 mg. of chromocene in 100 ml. of n-hexane was mixed with 3.2 grams of the activated fluorided silica support as described in the preceding Examples and the slurry was then evaluated as an ethylene polymerization catalyst in the same manner as described in Example 1C except that a polymerization time of 30 minutes was used. The melt index and melt flow ratio of the polyethylene obtained is delineated in Table 5.

For comparison a catalyst was prepared by dry tumbling 5% by weight of $(NH_4)_2SiF_6$ based on the weight of G-952 grade silica. This preparation used a 24 hour activation at 200° C.

A slurry of 20 mg. of chromocene in 100 ml. of n-hexane was mixed with 1.6 grams of the activated fluorided silica support prepared by dry blending as described above. Again the catalyst slurry obtained was evaluated for the polymerization of ethylene in the same manner as described in Example 1C except that a polymerization time of 30 minutes was used. The melt index and melt flow ratio of the polyethylene obtained are presented in Table 5. The data shows that the catalysts prepared by wet and dry blending of the silica and $(NH_4)_2SiF_6$ displayed very similar activity.

delineated in Table 7 show the variables involved and present the yield of polyethylene from ethylene in terms of chromium productivity in pounds of polymer per pound of chromium $\times$ $10^{-3}$, and the properties of the polyethylene product.

These data show that under fluid bed conditions, ethylene polymerization catalysts derived from silica supports fluorided at low temperatures (250° C.) with about 5% by weight of $(NH_4)_2SiF_6$ based on the weight of silica afforded ethylene polymers similar to that prepared by a prior art unfluorided catalyst (Control K) which must be activated at high temperatures (800° C.).

Although the invention has been described in its pre-

TABLE 5
COMPARISON OF WET AND DRY BLENDING OF SILICA WITH $(NH_4)_2SiF_6$

| EXAMPLE NO. | WT. % of $(NH_4)_2SiF_6$ USED TO TREAT SILICA SUPPORT | SILICA GRAMS | BLENDING MODE | ACTIVATION TEMP. ° C. | YIELD OF POLYETHYLENE AFTER 30 MINUTE POLYMERIZATION GRAMS | PROPERTIES OF POLYETHYLENE PRODUCED | |
|---|---|---|---|---|---|---|---|
| | | | | | | MELT INDEX | MELT FLOW RATIO |
| 24 | 5 | 3.2 | Wet | 200 | 216 | 1.7 | 47 |
| 25 | 5 | 3.2 | Dry | 200 | 236 | 1.2 | 50 |

TABLE 6
ETHYLENE COPOLYMERIZATION WITH FLUORIDED CATALYSTS

| EXAMPLE NO. | WT. % OF $(NH_4)_2SiF_6$ USED TO TREAT SILICA SUPPORT | ACTIVATION TEMP. ° C. | PROPYLENE CHARGED, GRAMS | POLYMERIZATION TIME MIN. | POLYMERIZATION YIELD GRAMS | PROPERTIES OF ETHYLENE POLYMER PRODUCED | | |
|---|---|---|---|---|---|---|---|---|
| | | | | | | Melt Index | Melt Flow Ratio | Density cc./gram |
| 26 | 4.0 | 200 | 0 | 60 | 159 | 2.5 | 41 | 0.964 |
| 27 | 4.0 | 200 | 39 | 60 | 94 | 4.4 | 38 | 0.951 |
| CONTROL I | 0 | 600 | 0 | 30 | 168 | 4.2 | 41 | 0.963 |
| CONTROL J | 0 | 600 | 38 | 60 | 112 | 11.2 | 37 | 0.955 |

EXAMPLES 26–27

The behavior of the fluorided catalysts of this invention was also determined in the copolymerization of ethylene with propylene.

A fluorided G-952 silica supported chromocene catalyst was prepared as in the preceding Examples by treating the support with 4% by weight of $(NH_4)_2SiF_6$ and activating at 200° C. Homopolymerization of ethylene and copolymerization of ethylene and propylene were then run using the procedure of Example 1C. These were then compared with each other and with Controls I and J which used unfluorided high temperature activated silica supported chromocene catalysts prepared in the same manner as the Control E catalyst slurry described above.

The polymerization data presented in Table 6 demonstrate that the copolymerization as well as homopolymerization behavior of the low temperature fluorided catalyst is similar to that of the unfluorided high temperature activated catalyst.

EXAMPLES 28–30
PILOT PLANT FLUID BED POLYMERIZATIONS OF ETHYLENE

Using a fluid bed reactor and process as disclosed in U.S. Pat. No. 3,687,920, several runs were made demonstrating the utility of a fluorided silica supported chromocene catalyst for the polymerization of olefins on a pilot plant scale. The operating conditions were: a reactor temperature of 95° C., total pressure of ethylene in the reactor = 300 psig., and a polymerization rate of 35 lbs. of polyethylene per hour. The results which are ferred forms with a certain degree of particularity, it is understood that the present disclosure of the preferred forms has been made only by way of example and that numerous changes may be resorted to without departing from the spirit and scope of the invention.

TABLE 7
PILOT PLANT FLUID BED POLYMERIZATION OF ETHYLENE

| PERTINENT DATA | EXAMPLE NO. | | | |
|---|---|---|---|---|
| | Control K | 28 | 29 | 30 |
| Activation Temp of Silica Support, ° C. | 800 | 250 | 250 | 250 |
| Wt. % $(NH_4)_2SiF_6$ used to treat Silica Support | 0 | 4.5 | 5.0 | 5.5 |
| Wt. % Chromocene loading on Silica Support | 3.3 | 2.5 | 2.5 | 4.8 |
| Chromium Productivity (lbs. polyethylene/lb. Cr $\times$ $10^{-3}$) | 334 | 132 | 345 | 240 |
| $H_2/C_2H_4$ Ratio | 0.06 | 0.10 | 0.07 | 0.07 |
| Melt Index | 5.9 | 3.8 | 5.0 | 7.2 |
| Melt Flow Ratio | 47 | 47 | 44 | 43 |
| % Cyclohexane Extractables | 1.6 | 2.7 | 1.7 | 1.4 |
| Density, g./cc. | 0.965 | 0.964 | 0.956 | 0.963 |
| Average particle size of polyethylene, inches | 0.016 | 0.011 | 0.015 | 0.015 |

What is claimed is:

1. Catalyst composition comprising at least one organo-chromium compound having the structure:

$$Ar_1 - Cr\ (II) - Ar_1$$

wherein $Ar_1$ is a monovalent radical selected from the group consisting of:

(1) cyclopentadienyl radicals having the structure:

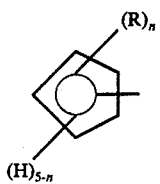

wherein R is a hydrocarbon radical having 1 to about 20 carbon atoms and $n$ is an integer having values of 0 to 5;

(2) indenyl radicals having the structure:

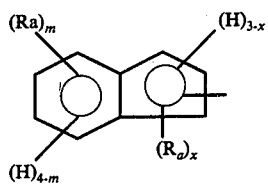

wherein each $R_a$ is a hydrocarbon radical having 1 to 10 carbon atoms, $m$ is an integer having values of 0 to 4, and $x$ is an integer having values of 0 to 3; and (3) fluorenyl radicals having the structure:

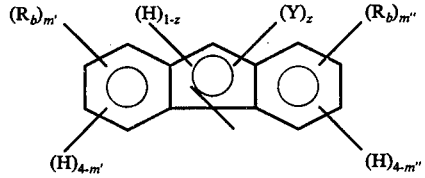

wherein each of $R_b$ is a hydrocarbon radical having 1 to 10 carbon atoms, each of $m$ and $m''$ is an integer having values of 0 to 4, Y is H or $R_b$ and z is an integer having values of 0 to 1; deposited on a silica support fluorided with less than 10% by weight of a fluoridation agent, based on the weight of said support, at a temperature of about 100° C. to about 400° C.

2. Catalyst composition claimed in claim 1 wherein the organo-chromium compound comprises a chromocene compound having the structure:

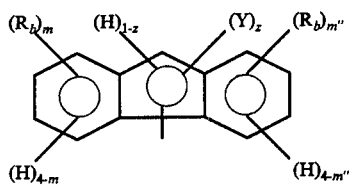

wherein each of R and R' is a hydrocarbon radical having 1 to about 20 carbon atoms and each of $n$ and $n'$ is an integer having values of 0 to 5.

3. Catalyst composition claimed in claim 1 wherein the organo-chromium compound comprises a compound of the structure:

Ar - Cr [II] - Ar' wherein Ar and Ar' are the same or different indenyl radicals having the structure:

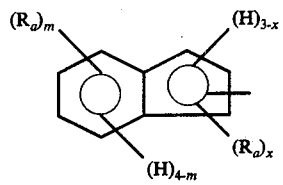

wherein each Ra is a hydrocarbon radical having 1 to 10 carbons, $m$ is an integer having values of 0 to 4, and $x$ is an integer having values of 0 to 3.

4. Catalyst composition claimed in claim 1 wherein the organo-chromium compound comprises a compound of the structure:

Ar'' - Cr [II] - Ar''' wherein Ar'' and Ar''' are the same or different fluorenyl radicals having the structure:

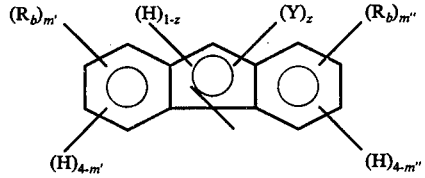

wherein each $R_b$ is a hydrocarbon radical having 1 to 10 carbons, each of $m'$ and $m''$ is an integer having values of 0 to 4, Y is H or $R_b$ and z is an integer having values of 0 to 1.

5. Catalyst composition claimed in claim 1 wherein the fluoridation agent comprises $(NH_4)_2SiF_6$.

6. Catalyst composition claimed in claim 5 wherein about 1 to about 9 percent by weight of $(NH_4)_2SiF_6$ based on the weight of silica is used at a temperature of about 200° C. to about 400° C.

7. Catalyst composition claimed in claim 1 wherein the fluoridation agent comprises $NH_4BF_4$.

8. Catalyst composition claimed in claim 1 wherein the fluoridation agent comprises $NH_4F$.

9. Catalyst composition claimed in claim 2 wherein the amount of chromocene compound deposited on the silica support is about 0.5 to about 10 weight percent based on the weight of the total catalyst composition.

10. Catalyst composition claimed in claim 1 wherein the silica support is fluorided at a temperature of about 200° C. to about 300° C.

11. Catalyst composition claimed in claim 1 wherein the amount of fluoridation agent used to fluoride the silica support is about 0.5 to < 10 percent based on the weight of silica.

12. Process for preparing a silica supported alpha-olefin polymerization catalyst which comprises:
(a) fluoriding said silica support with less than 10 weight %, based on the weight of said support, of a fluoridation agent at a temperature of about 100° C. to about 400° C.; and
(b) treating said fluorided silica support with sufficient quantities of the organo-chromium compound of claim 1 as to deposit from about 0.1 to about 3 weight percent of chromium on said support, calculated as the element.

13. Process claimed in claim 12 wherein the silica support is fluorided at a temperature of about 200° C. to about 300° C.

14. Process for preparing a silica supported alpha-olefin polymerization which comprises:
(a) treating a silica support with sufficient quantities of the organo-chromium compound claimed in claim 1 as to deposit about 0.1 to about 3 weight percent of chromium on said support calculated as the element; and
(b) fluoriding the treated support of (a) with a fluoridation agent at a temperature of about 100° C. to about 400° C.

* * * * *